T. TODISCO.
MEANS FOR CHECKING HORSES.
APPLICATION FILED SEPT. 3, 1908.
911,183.
Patented Feb. 2, 1909.
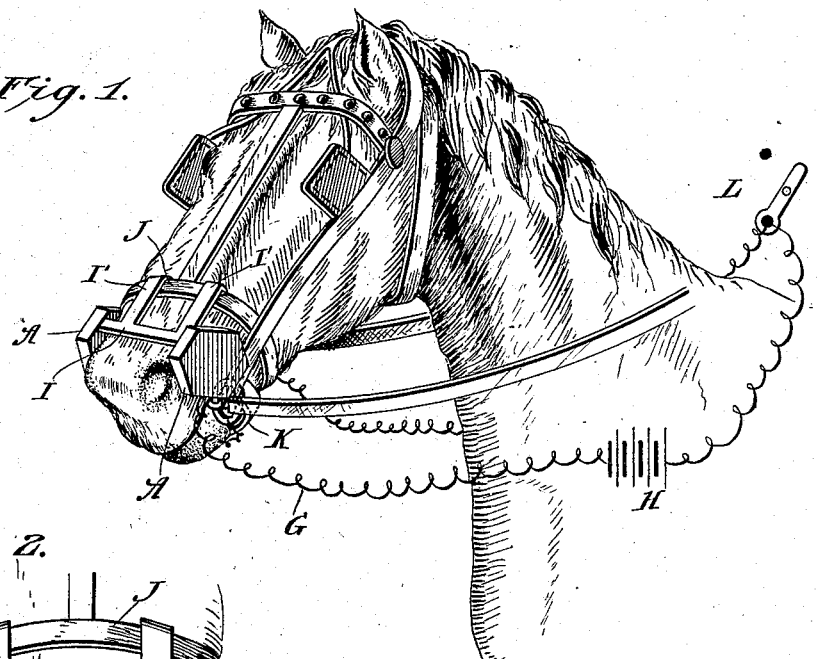
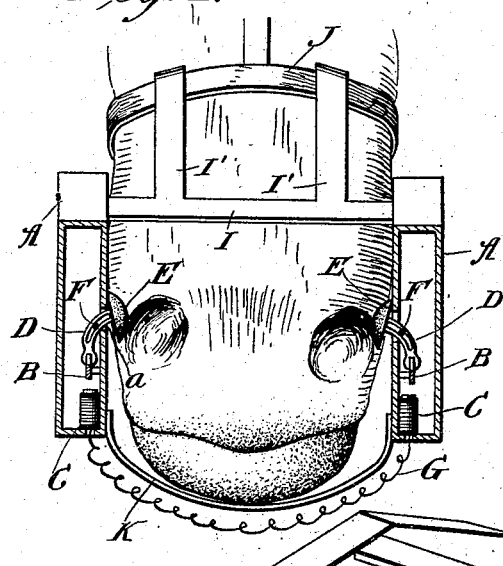
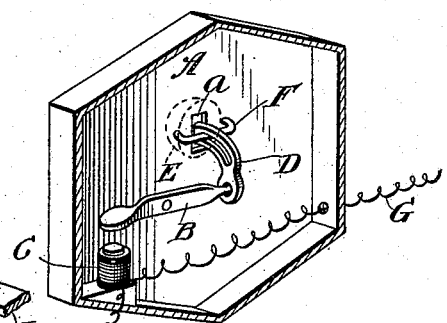
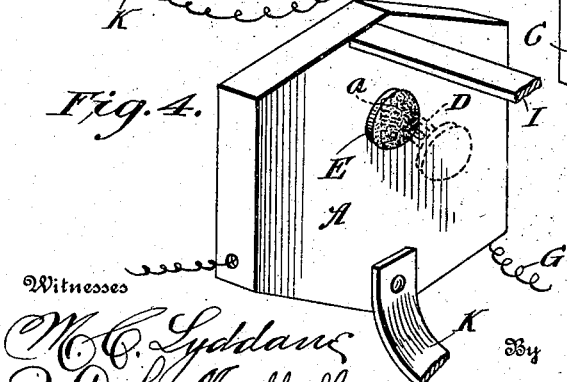
Witnesses
M. C. Lyddane
J. O. L. Mulhall
Inventor
Tobia Todisco
By Joshua R. H. Potts
Attorney

UNITED STATES PATENT OFFICE.

TOBIA TODISCO, OF PHILADELPHIA, PENNSYLVANIA.

MEANS FOR CHECKING HORSES.

No. 911,183. Specification of Letters Patent. Patented Feb. 2, 1909.

Application filed September 3, 1908. Serial No. 451,501.

*To all whom it may concern:*

Be it known that I, TOBIA TODISCO, a subject of the King of Italy, residing at Philadelphia, in the county of Philadelphia and State of Pennsylvania, have invented certain new and useful Improvements in Means for Checking Horses, of which the following is a specification.

My invention relates to emergency mechanism for checking or stopping runaway horses, and more particularly it has relation to electrical mechanism operated from the driver's seat whereby the nostrils of the horse can be closed when desired and the passage of air therethrough stopped, thus bringing the horse to a standstill.

The object of my invention is to provide a simple device of this character, which is absolute in its action and which may be easily supported from the head stall of the harness.

My invention consists in providing casings located on either side of the horse's head adjacent to the nostrils, each of these casings having mounted therein a presser button adapted to contact with the horse's nostrils just above the opening thereof, and each operated by an electro-magnet carried in said casing and electrically connected with a battery and switch carried in any convenient manner.

In the drawings, Figure 1, is a perspective view of a horse's head with my device applied thereto. Fig. 2, is a front view of the lower portion of the horse's head, the two casings and boxes being shown in section. Fig. 3, is an interior view of one of the boxes, the casing being broken away, and Fig. 4, is an inside face view of one of the boxes detached.

Like reference characters throughout the several views designate like parts.

A designates a box or casing of any desired shape preferably made of aluminium or other light and yet strong material, the box being of such size that it may have a firm bearing against the cheeks of a horse. Mounted in each of the boxes A is a lever B, one end of which forms the armature of an electro-magnet C suitably mounted within the casing, while the other end thereof is pivotally attached to the curved shank D of a presser button E. As will be seen from Fig. 3, the shank D is curved and slotted, a guide pin F passing through said slot and being attached to the casing. The shank D projects through an opening *a* formed in the inside face of the casing. Exterior to said opening is a button E which is preferably rounded and has a surface covered with leather, chamois skin, rubber, or other suitable material. A wire G leads from the electro-magnet C out of the casing to the carriage (not shown) and to the opposite magnet. Supported in the carriage or upon the horse or in any other convenient manner is a battery H in circuit with said magnets.

There are two boxes or casings A, one located on either side of the horse's head at a point just above the nostrils of the horse. These are connected by a band of metal I or other suitable material, which in turn is attached to a strap J on the bridle or other harness which encircles the horse's head in the manner of a head stall. The connecting band I may be attached to the strap J in any suitable manner as by the clips I'. A chin strap or chain K is attached to the lower portion of the boxes and passes beneath the horse's chin. The chin strap K and the band I should be of such length as to hold the box A rigidly in position so that they will not be forced outward when the presser buttons E are forced inward against the nostrils of the horse. It is for this reason that the band I should be of metal or other relatively rigid material.

The operation of my device is as follows: The casings are attached in the position shown in Fig. 1 so that the buttons E will be located just above the opening of the nostrils. The wires G extend to the carriage or to the saddle if the horse is being ridden instead of being driven. Any suitable switch L is located within the carriage or on the saddle which may be actuated by the fingers or feet. Under normal circumstances the switch is open and the circuit through the electro-magnets C broken. If however it is desired to check the horse upon a sudden emergency, it is only necessary to throw the switch when current will pass to the electro-magnets, they will become energized, attract the end of the lever B and force upward the shank D. This shank D has sufficient play at its point of connection with the lever B so that as the outer end of the lever moves upward the shank will turn on its pivot and be forced outward through the slot *a*, thereby forcing the presser buttons attached to the shank suddenly inward against the nostrils of the horse and closing the same, thus cutting off his supply of air and bringing him to a very quick stop.

Having thus described my invention what I claim as new and desire to secure by Letters Patent is:

1. A horse checking device comprising two presser buttons adapted to close against a horse's nostrils, electro-magnets for actuating said presser buttons and said magnets in an electric circuit including a source of electricity, and a circuit closer or switch.

2. In a horse checking device, opposed casings adapted to be located on either side of the horse's head adjacent to the nostrils thereof, presser buttons having shanks entering said casings, a lever attached to each of said shanks adapted to force them inwardly against the nostrils of the horse, and electro-magnets for actuating said levers, said magnets being connected in circuit with a battery and switch.

3. In a horse checking device, opposed casings adapted to be located on either side of the horse's head adjacent to the nostrils thereof, connections between said casings, presser buttons having curved shanks projecting through the inside walls of said casings, a lever in each casing pivoted to the wall thereof pivotally connected to said shank at one end and having an armature formed on the other end thereof, an electro-magnet located adjacent to each armature in each casing, and electric wires connecting the magnets in circuit with each other, with a battery and with a switch.

4. In a horse checking device, opposed casings, bands connecting said casings, means for supporting said casings from the head stall of a horse in such manner that said casings shall be located on both sides of the horse's head adjacent to the nostrils thereof, a lever located in each casing, an inwardly curved shank pivotally connected to one end of said lever, an armature formed on the other end of said lever, a presser button attached to each of said shanks on the inside face of said casing, a guide pin passing through a curved slot on each shank, an electro-magnet located in each casing adjacent to the armature end of said lever and connections from both of said electro-magnets to a battery and switch.

In testimony whereof I have signed my name to this specification in the presence of two subscribing witnesses.

TOBIA TODISCO.

Witnesses:
   FREDERIC B. WRIGHT,
   J. A. L. MULHALL.